(12) United States Patent
Guillard et al.

(10) Patent No.: US 7,490,484 B2
(45) Date of Patent: *Feb. 17, 2009

(54) INTEGRATED PROCESS AND GAS TREATMENT PROCESS

(75) Inventors: Alain Guillard, Paris (FR); Patrick Le Bot, Vincennes (FR); Bernard Saulnier, La Garenne Colombes (FR)

(73) Assignee: L'Air Liquide, Societe Anonyme A Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 330 days.

This patent is subject to a terminal disclaimer.

(21) Appl. No.: 11/159,954

(22) Filed: Jun. 23, 2005

(65) Prior Publication Data
US 2006/0000212 A1    Jan. 5, 2006

(51) Int. Cl.
F25J 3/00    (2006.01)
(52) U.S. Cl. .......................... 62/643; 62/646
(58) Field of Classification Search ............ 62/643, 62/646

See application file for complete search history.

(56) References Cited

U.S. PATENT DOCUMENTS

| 3,731,495 | A | * | 5/1973 | Coveney ............... 62/651 |
| 5,329,776 | A |   | 7/1994 | Grenier |
| 7,197,894 | B2 | * | 4/2007 | Guillard et al. .......... 62/643 |

FOREIGN PATENT DOCUMENTS

| EP | 0 504 029 | 9/1992 |
| EP | 0 748 763 | 12/1996 |

* cited by examiner

*Primary Examiner*—William C Doerrler
(74) *Attorney, Agent, or Firm*—Elwood Haynes

(57) ABSTRACT

Integrated air separation units with a petrochemical process. This invention provides an integrated process and gas treatment process wherein at least one first pressurized gas derived from a first process at a first site is expanded. Using the work generated by the expansion of at least one pressurized gas, a first gas compressor at the first site is driven, operates, and removes compressed gas from the first gas compressor. At least part of the compressed gas from the first gas compressor is sent to a gas treatment unit located at a remote second site. At least part of the compressed gas sent from the first site to the second site is treated in the gas treatment unit. At least one fluid from the gas treatment unit is removed and at least part of the fluid removed from the gas treatment unit is sent to the first site.

17 Claims, 3 Drawing Sheets

INTEGRATED PROCESS AND GAS TREATMENT PROCESS

CROSS-REFERENCE TO RELATED APPLICATIONS

This application claims the benefit of U.S. Non-Provisional application Ser. No. 10/778,572, filed Feb. 13, 2004, the entire contents of which are incorporated herein by reference.

BACKGROUND

Current natural gas reserves are often situated far from world markets. Although it is possible to transport the natural gas, in many cases it is preferred to convert the natural gas fields in situ into more readily transportable products such as synthetic fuels, methanol or dimethyl ether. The conversion processes generally consume very large amounts of oxygen and produce excess steam. Background for this field is to be found in "Oxygen Facilities for Synthetic Fuel Projects", by W. J. Scharle et al., Journal of Engineering for Industry, November 1981, Vol 103, pp. 409-417, in "Fundamentals of Gas to Liquids" January 2003, The Petroleum Economist Ltd, and in EP-A-0748763.

It is not always possible to construct an air separation unit close to the site of the conversion process, for example for environmental or economic reasons. In this case, the steam generated is sent via a pipeline to the air separation unit site and there it is expanded in a turbine coupled to the main compressor of the air separation unit.

However, the cost of such steam pipelines is prohibitive since the steam has to be maintained at a high temperature to prevent condensation.

In some cases, there may be a number of processes, each producing excess energy in the form of steam or another hot gas. There may be insufficient energy available on the site of the process to justify exporting that energy and the steam or other hot gas may be vented to the atmosphere. Furthermore, the individual processes may each produce a different grade of steam, such that the two grades of steam cannot be sent to a single steam turbine.

SUMMARY

It is an object of the present invention to provide a process for separating air using the energy generated by a process remote from the air separation unit.

This invention provides an integrated process and gas treatment process wherein at least one first pressurized gas derived from a first process at a first site is expanded. Using the work generated by the expansion of at least one pressurized gas, a first gas compressor at the first site is driven, operates, and removes compressed gas from the first gas compressor. At least part of the compressed gas from the first gas compressor is sent to a gas treatment unit located at a remote second site. At least part of the compressed gas sent from the first site to the second site is treated in the gas treatment unit. At least one fluid from the gas treatment unit is removed and at least part of the fluid removed from the gas treatment unit is sent to the first site.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

The figures are not to scale.

DESCRIPTION OF PREFERRED EMBODIMENTS

The term "partly pressurized" implies that the oxygen or nitrogen streams may for example be pumped to a pressure less than their required pressure and then vaporised at the second site before entering the pipelines. Compressors at the first site subsequently compress the nitrogen and oxygen to their required final pressures, if needed.

Figure 1:
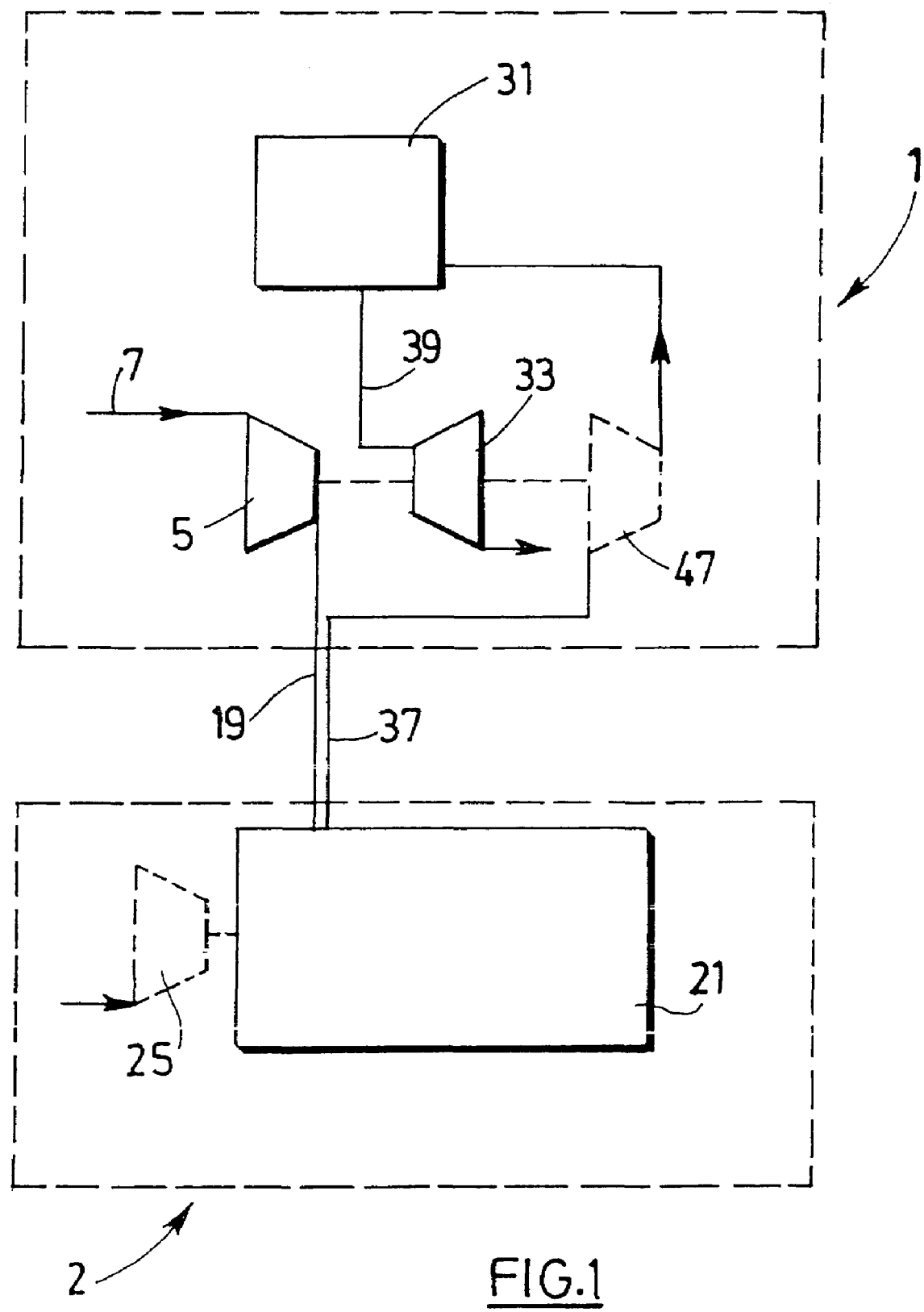
FIG. 1 illustrates one embodiment of the current invention, which includes an integrated process and air separation unit.

FIG. 1 shows an integrated process and air separation unit.

The integrated process unit 31 is located at a first site 1 and may for example be a GTL unit, for example comprising a Fischer Tropsch unit, a methanol production unit, a DME production unit, a fuel combustion unit such as a gas turbine or any unit producing directly or indirectly steam or another hot gas.

The term "process unit" implies that a process takes place at some location and at some time within the unit. However, the unit itself does not necessarily operate according to a process, which is globally exothermic.

The steam or other hot gas 39 is expanded in a turbine 33 (which may form part of process unit 31) located at the first site 1 and work from the turbine is transferred via coupling to an air compressor 5. In this example, the air compressor 5 compresses only air 7 to be sent to the air separation unit 21. The compressed air 19 is compressed to a pressure above 8 bars, preferably above 12 bars and is sent to the air separation unit 21 at a second site 2 at least 1 km away. It is nevertheless conceivable that compressed air from the air compressor 5 could also be sent elsewhere, i.e., to another air separation unit.

Compressed air may also be sent to the air separation unit 21 from an air compressor 25 located at the second site 2.

Air to be separated in the air separation unit 21 is purified in a purification unit at the second site and all the air streams sent to the air separation unit 21 at the second site from the purification unit at the second site are at pressures less than 50 bars.

A product gas 37 (which may be replaced by a product liquid) coming from the air separation unit is also sent to another pipeline running at least substantially parallel to the air pipeline over at least part of its length, thereby saving civil engineering costs. This gas, which may be nitrogen, oxygen or argon, is unpressurized, partly pressurized or pressurized. Where the gas is unpressurized or partly pressurized, it may be compressed in a compressor 47 coupled to the turbine 33 at the first site. The gas may then be used at the first site and may for example be used in the process.

Figure 2:
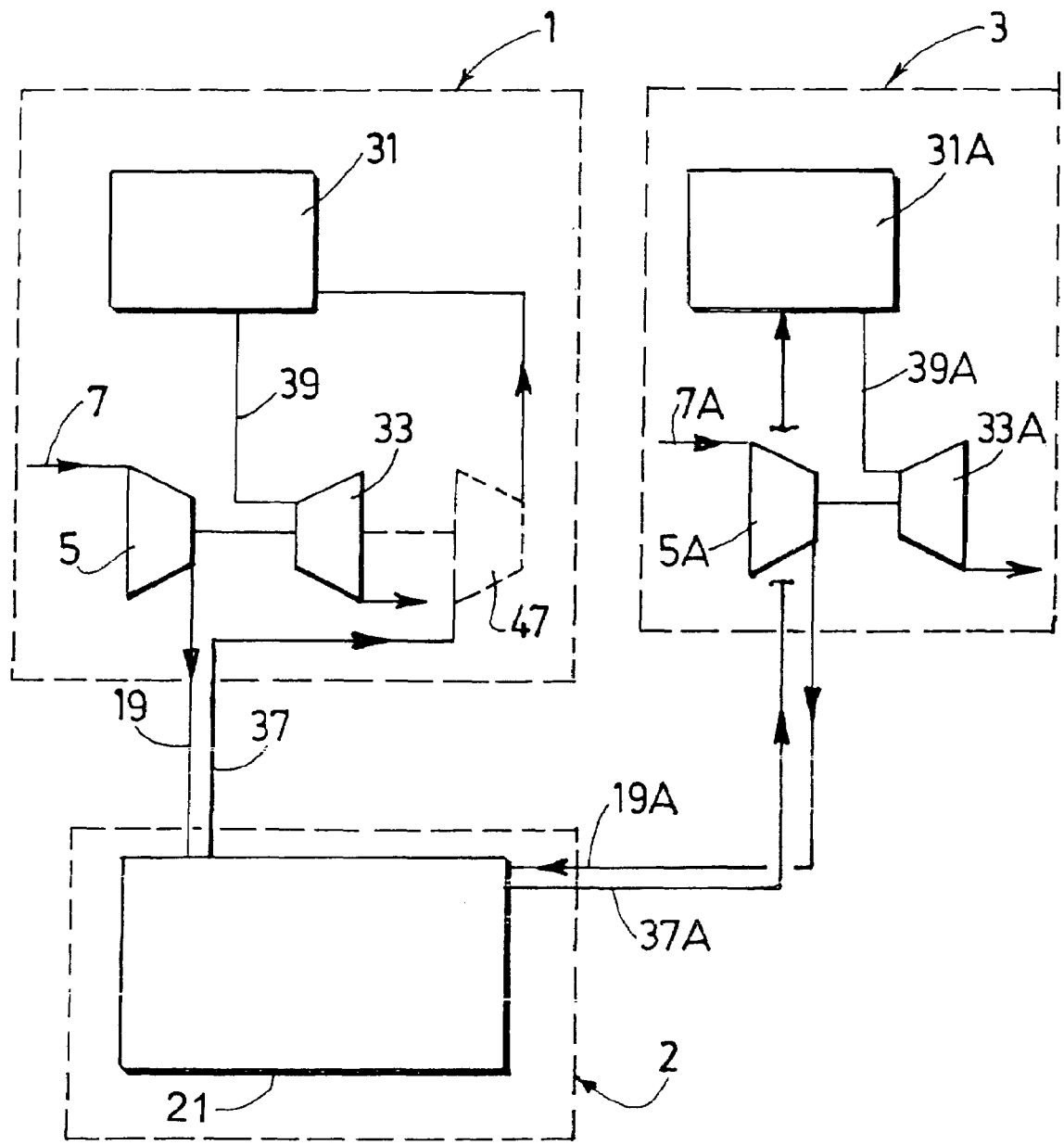
FIG. 2 illustrates a second embodiment, which includes an air separation unit integrated with two integrated processes.

FIG. 2 shows an air separation unit 21 integrated with two integrated processes. The first process unit 31 is as described above with reference to FIG. 1. The further process unit 31A is located at a third site 3, at least 1 km from the second site, where the air separation unit 3 is located and, preferably, at least 1 km from the first site. However, the further unit 31A may be adjacent to the first site.

The further process unit 31A may operate according to the same process as the first unit 31 or according to a different process.

The unit 31A produces steam or another hot gas 39A, which is expanded in turbine 33A. Gases 39 and 39A may both be steam but the gas 39A may be steam having the same or different properties, i.e., the same or a different pressure as the gas 39 and/or the same or a different temperature as the gas 39.

Air compressor 5A driven by turbine 33A supplies air 19A only to the air separation unit via pipeline. The air 7A compressed by compressor 5A is compressed to a pressure above 8 bars, preferably above 12 bars.

Additionally, as in FIG. 1, there may a dedicated air compressor at the second site 2.

Preferably, the pipelines 19, 19A, and the compressors 5 and 5A supply the air to the second site 2 at substantially the same pressure so that only a single purification unit within the air separation unit 21 is necessary. This may mean that the compressors 5 and 5A compress the air to substantially the same pressure, if the pressure losses within the pipelines are substantially the same. Alternatively, the compressors 5 and 5A may compress the air to different pressures but the air arrives at the air separation unit at substantially the same pressure from both pipelines due to a judicious choice of the pipeline diameters and/or lengths and/or the use of an expansion means, such as a valve.

If several purification means are provided, the air supplied by the compressors 5 and 5A may arrive at the second site at different pressures (due to different pressures at the compressor outlets and/or different pressure drops within the pipeline systems). In this case, the air pressures may be selected or modified at the second site to correspond to pressures of different columns of the air separation unit. For example, one air stream may be purified at the pressure of the high pressure column of the air separation unit whereas another air stream may be purified at the pressure of an intermediate or low pressure column of the air separation unit.

A product gas 37A coming from the air separation unit is also sent to another pipeline running substantially parallel to the air pipeline for air 19A over at least part of its length. This gas, which may be nitrogen, oxygen or argon, is unpressurized, partly pressurized, or pressurized. Where the gas is unpressurized or partly pressurized, it may be compressed in a compressor coupled to the turbine 33A at the third site. The gas may then be used at the third site, for example in the process or another process.

Alternatively, the pipeline for air 19A may run substantially parallel to the pipeline for air 19 over at least a part of its length or may feed into that pipeline 19 (or vice versa depending on where the sites 1, 2, 3 are).

Similarly, the pipeline for gas 37A may run substantially parallel to the pipeline for gas 37 over at least a part of its length or may feed into that pipeline 37 (or vice versa depending on where the sites are) if the gases have substantially the same purity or can be mixed to form a mixture having a required composition.

At least one fluid produced by the air separation unit may be sent to the first or third site or both.

The third site 3 may be contiguous with the second site 2, less than 1 km from the second site, or at least 1 km from the second site, and/or the third site 3 may be contiguous with the first site 1, less than 1 km from the first site, or at least 1 km from the first site.

The air separation unit may be of any known type. Ideally, there should be no air compressor 25 located at the second site to produce air for the air separation unit. All the feed air should come from other sites. One example of an air separation process well suited to this application is that of FIG. 1 of EP-A-0504029, where all the air is compressed to a high pressure using a single compressor.

It will be appreciated that a first stream of air may be compressed using work from a first expansion step (such as a steam turbine expansion) and a second stream of air may be compressed using work from a second expansion step (such as a gas turbine expansion), the first and second air streams may be mixed, possibly after pressure equalisation and sent from the first site to the second site.

Figure 3:
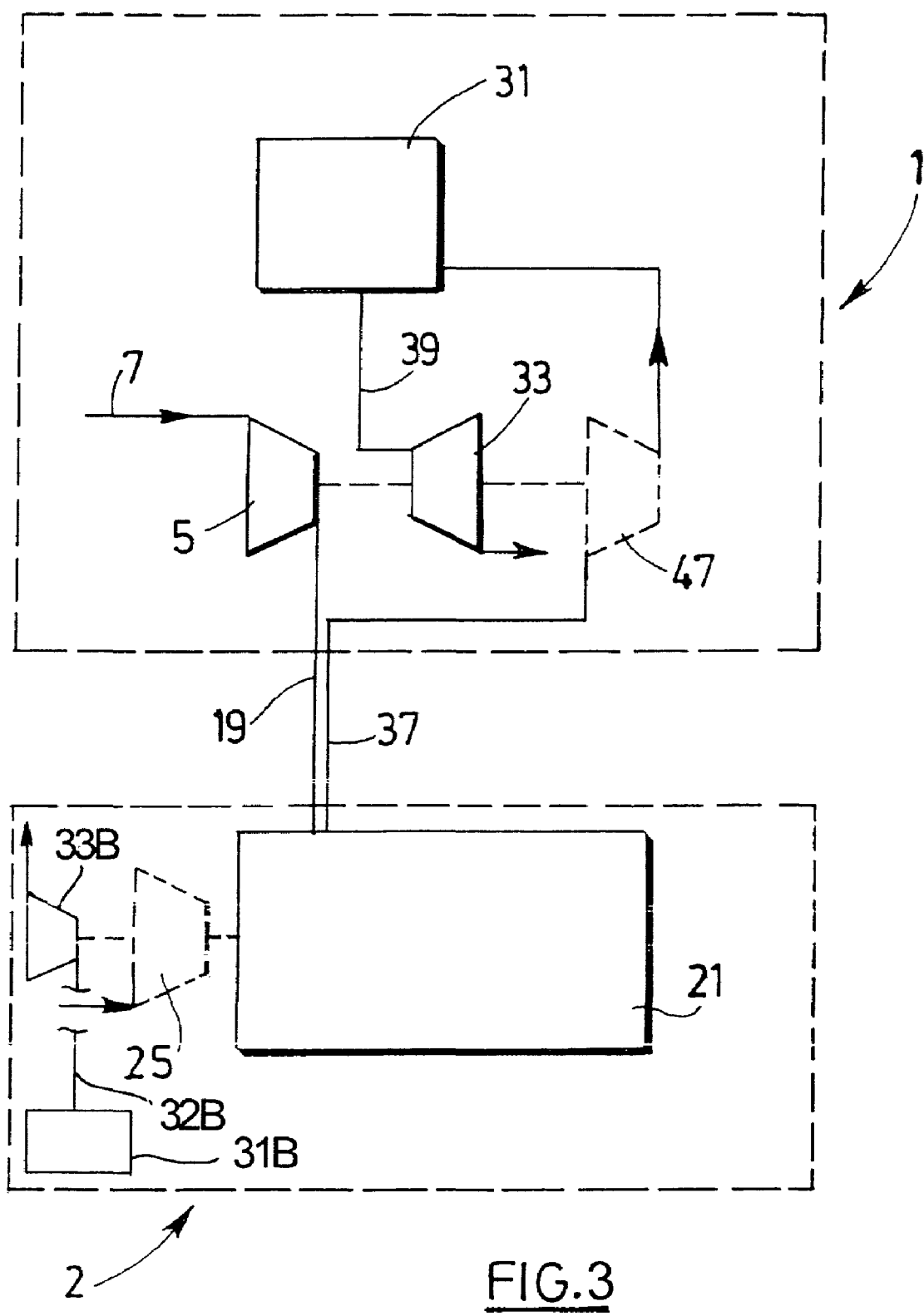
FIG. 3 illustrates a third embodiment with an integrated process and air separation unit.

FIG. 3 shows an integrated process and air separation unit.

The integrated process unit 31 is located at a first site 1 and may for example be a GTL unit, for example comprising a Fischer Tropsch unit, a methanol production unit, a DME production unit, a fuel combustion unit such as a gas turbine or any unit producing directly or indirectly steam or another hot gas.

The term "process unit" implies that a process takes place at some location and at some time within the unit. However the unit itself does not necessarily operate according to a process, which is globally exothermic.

The steam or other hot gas 39 is expanded in a turbine 33 (which may form part of process unit 31) located at the first site 1 and work from the turbine is transferred via coupling to an air compressor 5. In this example, the air compressor 5 compresses only air 7 to be sent to the air separation unit 21. The compressed air 19 is compressed to a pressure above 8 bars, preferably above 12 bars and is sent to the air separation unit 21 at a second site 2 at least 1 km away. It is nevertheless conceivable that compressed air from the air compressor 5 could be sent elsewhere, for example to another air separation unit.

Compressed air is sent to the air separation unit 21 from an air compressor 25 located at the second site 2. The air compressor 25 is driven by a turbine 33B, which expands gas 32B from a process unit 31B at the second site. Air to be separated in the air separation unit 21 is purified in a purification unit at the second site and all the air streams sent to the air separation unit 21 at the second site from the purification unit at the second site are at pressures less than 50 bars.

A product gas 37 (which may be replaced by a product liquid) coming from the air separation unit is also sent to another pipeline running at least substantially parallel to the air pipeline over at least part of its length, thereby saving civil engineering costs. This gas, which may be nitrogen, oxygen or argon, is unpressurized, partly pressurized or pressurized. Where the gas is unpressurized or partly pressurized, it may be compressed in a compressor 47 coupled to the turbine 33 at the first site. The gas may then be used at the first site and may for example be used in the process.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used as an integrated gas treatment process, said method comprising:
 a) expanding at least one first pressurized gas, wherein said first pressurized gas is derived from at least one first process performed at a first site;

b) driving at least a first gas compressor with the work generated by said expansion of said first pressurized gas, wherein said first gas compressor is located at said first site;

c) removing a first compressed gas from said first gas compressor;

d) sending at least part of said first compressed gas to a gas treatment unit, wherein:
   1) said gas treatment unit is located at a second site; and
   2) said second site is located at least about 1 km away from said first site;

e) treating said first compressed gas in said gas treatment unit;

f) removing at least one fluid from said first compressed gas;

g) sending at least part of said removed fluid from said gas treatment unit to said first site;

h) producing a first compressed air stream at said first site by a first compression process, wherein said first compression process uses work from at least one first expansion step;

i) producing a second compressed air stream at said first site by a second compression process, wherein said second compression process uses work from at least one second expansion step;

j) mixing said first compressed air stream and said second compressed air stream to form a combined air stream; and k) sending said combined air stream to an air separation unit located at said second site.

2. A method which may be used as an integrated gas treatment process, said method comprising:

a) expanding at least one first pressurized gas, wherein said first pressurized gas is derived from at least one first process performed at a first site;

b) driving at least a first gas compressor with the work generated by said expansion of said first pressurized gas, wherein said first gas compressor is located at said first site;

c) removing a first compressed gas from said first gas compressor;

d) sending at least part of said first compressed gas to a gas treatment unit, wherein:
   1) said gas treatment unit is located at a second site; and
   2) said second site is located at least about 1 km away from said first site;

e) treating said first compressed gas in said gas treatment unit;

f) removing at least one fluid from said first compressed gas;

g) sending at least part of said removed fluid from said gas treatment unit to said first site;

a) expanding a third pressurized gas, wherein said third pressurized gas is derived from a third process performed at a third site;

b) driving a third gas compressor with the work generated by said expansion of said third pressurized gas, wherein said third gas compressor is located at said third site;

c) removing a third compressed gas from said third gas compressor; and d) sending at least part of said third compressed gas to said gas treatment unit.

3. The method of claim 2, wherein said third site is located away from said first site and said second site.

4. The method of claim 2, further comprising sending a third fluid to said third site, wherein said third fluid is removed from said gas treatment unit.

5. The method of claim 3, wherein said third fluid is enriched in a component of air from an air separation unit at said second site.

6. The method of claim 2, wherein said first pressurized gas and said third pressurized gas both comprise substantially the same principal components.

7. The method of claim 2, wherein said first pressurized gas and said third pressurized gas have different pressures.

8. The method of claim 2, wherein said first pressurized gas and said third pressurized gas have different temperatures.

9. The method of claim 2, wherein said first pressurized gas and said third pressurized gas comprise substantially different principal components.

10. The method of claim 9, wherein said first pressurized gas and said third pressurized gas have different pressures.

11. The method of claim 9, wherein said first pressurized gas and said third pressurized gas have different temperatures.

12. The method of claim 2, further comprising:
   a) removing at least one enriched fluid from an air separation unit, wherein:
      1) said enriched fluid comprises at least one member selected from the group consisting of:
         i) an oxygen enriched fluid; and
         ii) a nitrogen enriched fluid;
      2) said air separation unit is located at said second site;
   b) sending at least part of said enriched fluid to said first process and to said third process;
   c) deriving said first pressurized gas from said first process;
   d) deriving said third pressurized gas from said third process;
   e) expanding at least part of said first pressurized gas in a first turbine to produce work;
   f) expanding at least part of said third pressurized gas in a third turbine to produce work;
   g) using at least part of said work produced by said first turbine to compress air in a first air compressor, wherein:
      1) said first air compressor is located at said first site; and
      2) said first air compressor provides compressed air to said air separation unit; and
   h) using at least part of said work produced by said third turbine to compress air in a third air compressor, wherein:
      1) said third air compressor is located at said third site; and
      2) said third air compressor provides compressed air to said air separation unit.

13. The method of claim 12, wherein said first and said third pressurized gases are steam.

14. A method which may be used as an integrated gas treatment process, said method comprising:

a) expanding at least one first pressurized gas, wherein said first pressurized gas is derived from at least one first process performed at a first site;

b) driving at least a first gas compressor with the work generated by said expansion of said first pressurized gas, wherein said first gas compressor is located at said first site;

c) removing a first compressed gas from said first gas compressor;

d) sending at least part of said first compressed gas to a gas treatment unit, wherein:
   1) said gas treatment unit is located at a second site; and 2) said second site is located at least about 1 km away from said first site;
e) treating said first compressed gas in said gas treatment unit;
f) removing at least one fluid from said first compressed gas;
g) sending at least part of said removed fluid from said gas treatment unit to said first site; wherein:
   a) at least part of a second compressed gas is sent from a second compressor to said gas treatment unit; and
   b) said second compressor is located at said second site.

15. A method which may be used as an integrated gas treatment process, said method comprising:
   a) expanding at least one first pressurized gas, wherein said first pressurized gas is derived from at least one first process performed at a first site;
   b) driving at least a first gas compressor with the work generated by said expansion of said first pressurized gas, wherein said first gas compressor is located at said first site;
   c) removing a first compressed gas from said first gas compressor;
   d) sending at least part of said first compressed gas to a gas treatment unit, wherein:
      1) said gas treatment unit is located at a second site; and
      2) said second site is located at least about 1 km away from said first site;
   e) treating said first compressed gas in said gas treatment unit;
   f) removing at least one fluid from said first compressed gas;
   g) sending at least part of said removed fluid from said gas treatment unit to said first site
      a) expanding at least one second pressurized gas, wherein said second pressurized gas is derived from at least one second process performed at said second site;
      b) driving at least one second gas compressor with the work generated by said expansion of said second pressurized gas, wherein said second gas compressor is located at said second site;
      c) removing a second compressed gas from said second gas compressor;
      d) sending at least part of said second compressed gas to said gas treatment unit.

16. A method which may be used as an integrated gas treatment process, said method comprising:
   a) expanding at least one first pressurized gas, wherein:
      1) said first pressurized gas is derived from at least one first process performed at a first site;
      2) said first pressurized gas comprises at least one member selected from the group consisting of:
         i) air;
         ii) a hot gas produced by a combustor of a gas turbine; and
         iii) steam; and
      3) said first process comprises at least one member selected from the group consisting of:
         i) a fuel combustion process;
         ii) a GTL process;
         iii) a methanol production process;
         iv) a gas turbine process; and
         v) a DME production process;
   b) driving at least a first air compressor with the work generated by said expansion of said first pressurized gas, wherein said first air compressor is located at said first site;
   c) removing a compressed air stream from said first air compressor, wherein said compressed air stream has a pressure of at least about 8 bar;
   d) sending at least part of said compressed air stream to an air separation unit, wherein:
      1) said air separation unit is located at a second site; and
      2) said second site is located at least about 1 km away from said first site;
   e) separating said compressed air stream in said air separation unit;
   f) removing at least one fluid enriched in a component of air from said air separation unit;
   g) sending at least part of said fluid enriched in a component of air from said air separation unit to said first site;
   h) expanding a third pressurized gas, wherein said third pressurized gas is derived from a third process performed at a third site;
   i) driving a third air compressor with the work generated by said expansion of said third pressurized gas, wherein:
      1) said third air compressor is located at said third site; and
      2) said third site is located away from said first site and said second site;
   j) removing a third compressed air stream from said third gas compressor; and
   k) sending at least part of said third compressed air stream to said air separation unit.

17. An apparatus which may be used for producing a fluid by gas treatment, said apparatus comprising:
   a) a first process unit, wherein said first process unit is located at a first site;
   b) a first turbine, wherein:
      1) said first turbine is located at said first site;
      2) said first turbine is coupled to at least a first gas compressor; and
      3) said first gas compressor is located at said first site;
   c) a means for sending a gas derived from said first process unit to said first turbine;
   d) a gas treatment unit, wherein:
      1) said gas treatment unit is located at a second site; and
      2) said second site is located at least about 1 km away from said first site;
   e) a first pipeline for sending gas from said first gas compressor to said gas treatment unit;
   f) a second pipeline for sending a fluid removed from said gas treatment unit to said first site;
   g) a second turbine, wherein:
      1) said second turbine is located at a third site;
      2) said second turbine work expands a second pressurized gas;
      3) said second pressurized gas is derived from a second process;
      4) said second process is performed at said third site;
   h) a second gas compressor, wherein said second gas compressor is located at said third site; and
   i) a third pipeline, wherein:
      1) said third pipeline sends at least part of a compressed gas from said second gas compressor to said gas treatment unit; and
      2) said third site is located away from said first site and said second site.

* * * * *